United States Patent

Mochizuki et al.

Patent Number: 5,587,445
Date of Patent: Dec. 24, 1996

[54] HIGHLY OXYGEN-PERMEABLE HEAT-RESISTANT MATERIAL

[75] Inventors: Shigeo Mochizuki; Masahiro Matsumoto, both of Nagoya; Toshio Yamazaki; Shoji Ichinohe, both of Gunma-ken, all of Japan

[73] Assignee: Menicon Co., Ltd., Nagoya, Japan

[21] Appl. No.: 588,388

[22] Filed: Jan. 18, 1996

[30] Foreign Application Priority Data

Jan. 20, 1995 [JP] Japan .................. 7-007536

[51] Int. Cl.⁶ .................................... C08F 34/02
[52] U.S. Cl. ................ 526/271; 526/279; 528/32; 351/160 R
[58] Field of Search ................... 526/279, 271; 528/32; 351/160 R

[56] References Cited

U.S. PATENT DOCUMENTS 5,162,470  11/1992  Stenger-Smith ................ 526/279
5,258,490  11/1993  Chang ................ 526/279

*Primary Examiner*—Mark D. Sweet
*Attorney, Agent, or Firm*—Oblon, Spivak, McClelland, Maier & Neustadt, P.C.

[57] ABSTRACT

A highly oxygen-permeable heat-resistant material consisting essentially of a polymer obtained by polymerizing a polymerizable component containing a silicon-containing stilbene derivative of the formula (I):

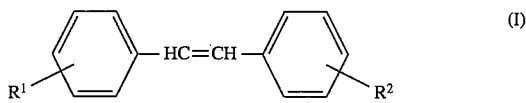

wherein each of $R^1$ and $R^2$ which are independent of each other, is a hydrogen atom or a group of the formula (II):

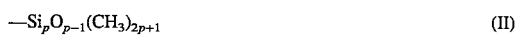

wherein p is an integer of from 1 to 8, provided that at least one of $R^1$ and $R^2$ is the group of the formula (II).

7 Claims, No Drawings

HIGHLY OXYGEN-PERMEABLE HEAT-RESISTANT MATERIAL

The present invention relates to a highly oxygen-permeable heat-resistant material. More particularly, it relates to a highly oxygen-permeable heat-resistant material which is excellent in the oxygen permeability and heat resistance and has high hardness, a high refractive index and excellent transparency, dimensional stability and durability and which is thus suitable for use as an oxygen-enriching membrane or as an ocular lens material such as a contact lens material or an intraocular lens material.

Heretofore, in order to increase the oxygen permeability of a contact lens material, it has been attempted to copolymerize a silicon-containing (meth)acrylate type monomer or a silicon-containing styrene type monomer having a siloxane bond in its molecule with a suitable copolymerizable component and to use the copolymer thereby obtained.

However, in order to further improve the oxygen permeability of a contact lens material, it is required to use a large amount of the silicon-containing (meth)acrylate type monomer or the silicon-containing styrene type monomer at the time of preparing the above copolymer. Consequently, the resulting copolymer has had problems such that the glass transition temperature tends to be very low or does not substantially increase so that the hardness is inadequate as a contact lens material, and it tends to be a material inferior also in the dimensional stability.

Under these circumstances, the present inventors have conducted extensive researches to develop a material which is excellent in the oxygen permeability and which at the same time has a high glass transition temperature and high hardness and is excellent in the heat resistance and dimensional stability, and as a result, have found that a material consisting essentially of a polymer obtained by using a specific stilbene derivative as a polymerizable component, not only is excellent in the above physical properties but also is excellent in the transparency and durability and has a high refractive index. The present invention has been accomplished on the basis of this discovery.

That is, the present invention provides a highly oxygen-permeable heat-resistant material consisting essentially of a polymer obtained by polymerizing a polymerizable component containing a silicon-containing stilbene derivative of the formula (I):

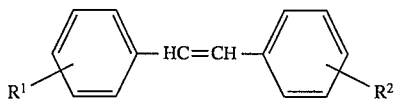

wherein each of $R^1$ and $R^2$ which are independent of each other, is a hydrogen atom or a group of the formula (II):

$$-Si_pO_{p-1}(CH_3)_{2p+1} \quad \text{(II)}$$

wherein p is an integer of from 1 to 8, provided that at least one of $R^1$ and $R^2$ is the group of the formula (II).

Now, the present invention will be described in detail with reference to the preferred embodiments.

As mentioned above, the highly oxygen-permeable heat-resistant material of the present invention is the one consisting essentially of a polymer obtained by polymerizing a polymerizable component containing a silicon-containing stilbene derivative of the formula (I):

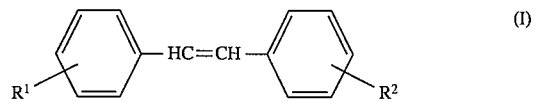

wherein each of $R^1$ and $R^2$ which are independent of each other, is a hydrogen atom or a group of the formula (II):

$$-Si_pO_{p-1}(CH_3)_{2p+1} \quad \text{(II)}$$

wherein p is an integer of from 1 to 8, provided that at least one of $R^1$ and $R^2$ is the group of the formula (II).

The silicon-containing stilbene derivative of the formula (I) is a compound with a nature to impart excellent permeability to the resulting polymer and increase the glass transition temperature to improve the hardness, heat resistance and dimensional stability, as well as to impart excellent transparency, durability and a high refractive index.

In the above formula (I), each of $R^1$ and $R^2$ which are independent of each other, is a hydrogen atom or a group of the formula (II). In the formula (II), when p is larger than 8, the relative amount of units derived from the stilbene structure in the polymer decreases, whereby it tends to be difficult to obtain the effect of improving the heat resistance, such being undesirable.

Further, in the above formula (I), at least one of $R^1$ and $R^2$ is the group of the formula (II). It is preferred that each of $R^1$ and $R^2$ is the group of the formula (II), since the oxygen-permeability of the resulting polymer will thereby be effectively improved.

When $R^1$ and/or $R^2$ in the formula (I) is a group of the formula (II), the respective position may be the o-, m- or p-position to the ethylene group (—HC=CH—). However, taking into consideration the copolymerizability with e.g. a monomer having an unsaturated double bond copolymerizable with the silicon-containing stilbene derivative and the mobility of $R^1$ and $R^2$ due to the steric hindrance, it is preferred that each of $R^1$ and $R^2$ is bonded at the p- or m-position to the ethylene group.

Typical examples of the silicon-containing stilbene derivative include 3-trimethylsilylstilbene, 4-trimethylsilylstilbene, 3,3'-bis(trimethylsilyl)stilbene, 4,4'-bis(trimethylsilyl)stilbene, 4,3'-bis(trimethylsilyl)stilbene, 3-pentamethyldisiloxanylstilbene, 4-pentamethyldisiloxanylstilbene, 3,3'-bis(pentamethyldisiloxanyl)stilbene, 4,4'-bis(pentamethyldisiloxanyl)stilbene, 3-tris(trimethylsiloxy)silylstilbene, 4-tris(trimethylsiloxy)silylstilbene, 3,3'-bis(tris(methylsiloxy)silyl)stilbene and 4,4'-bis(tris(trimethylsiloxy)silyl)stilbene. These compounds may be used alone or in combination as a mixture of two or more of them. Among them, 4,4'-bis(trimethylsilyl)stilbene, 3,3'-bis(trimethylsilyl)stilbene and 4,3'-bis(trimethylsilyl)stilbene are preferred in view of the improvement in the oxygen permeability and heat resistance of the resulting polymer.

The stilbene derivative has a cis-form and a trans-form. In the present invention, either form may be employed. However, from the viewpoint of the polymerizability with other polymerizable component, the trans-form is preferred.

In the present invention, from a polymer obtained by using the above silicon-containing stilbene derivative as a sole polymerizable component, it is possible to obtain a material which is particularly excellent in the oxygen permeability and has a high glass transition temperature, high hardness and excellent heat resistance and dimensional stability. However, it is possible to use, in addition to such as silicon-containing stilbene derivative, a monomer having an unsaturated double bond, (hereinafter referred to as monomer (B)) copolymerizable with the silicon-containing stilbene derivative (hereinafter referred to as silicon-containing stilbene derivative (A)), as a polymerizable component. The monomer (B) may be used in a proper combination with the silicon-containing stilbene derivative (A) by adjusting its amount, depending upon the nature of the desired highly oxygen-permeable heat-resistant material.

For example, in order to improve the ultraviolet absorptivity of the resulting highly oxygen-permeable heat-resistant material or to further improve the heat resistance or hardness, it is preferred to employ maleic anhydride or maleimide compound as the monomer (B).

Typical examples of the maleimide compound include trimethylsilylmethylmaleimide, trimethylsilylethylmaleimide, trimethylsilylpropylmaleimide, N-tristrimethylsiloxystyrylmethylmaleimide, N-(3-tristrimethylsiloxysilylpropyl)maleimide, N-2,2,2-trifluoroethyl)maleimide, N-(2-trifluoromethyl)phenylmaleimide, N-(3-trifluromethyl)phenylmaleimide, N-(4-trifluromethyl)phenylmaleimide, N-(4-perfluoropropyl)phenylmaleimide, N-(4-perfluoroisopropyl)phenylmaleimide, N-(4-perfluorobutyl)phenylmaleimide, N-(4-perfluorooctyl)phenylmaleimide, N-(3,5-bis(trifluoromethyl))phenylmaleimide, N-(3,5-bis(trifluoromethyl))benzylmaleimide, N-(perfluorooctyl)phenylmaleimide, N-(3,5-bis(2,2,2-trifluoroethyl))phenylmaleimide, N-phenylmaleimide, N-chlorophenylmaleimide, N-methylphenylmaleimide, N-hydroxyphenylmaleimide, N-methoxyphenylmaleimide, N-carboxyphenylmaleimide, N-nitrophenylmaleimide, N-tribromophenylmaleimide, an N-alkylmaleimide such as N-methylmaleimide, N-ethylmaleimide, N-propylmaleimide, N-butylmaleimide or N-cyclohexylmaleimide, N-naphthylmaleimide, N-laurylmaleimide, N,N'-ethylene bismaleimide, N,N'-hexamethylene bismaleimide, N,N'-m-phenylene bismaleimide, N,N'-p-phenylene bismaleimide, N,N'-4,4'-diphenyl ether bismaleimide, N,N'-methylenebis(3-chloro-p-phenylene)bismaleimide, N,N'-4,4'-diphenylsulfone bismaleimide, N,N'-4,4'-dicyclohexylmethane bismaleimide, N,N'-α,α'-4,4'-dimethylene cyclohexane bismaleimide, N,N'-4,4'-diphenylcyclohexane bismaleimide, 2-hydroxyethylmalemide, and maleimide. These maleimides may be used alone or in combination as a mixture of two or more of them.

For example, in order to improve the hydrophilic nature of the resulting highly oxygen-permeable heat-resistant material, (meth)acrylic acid, a hydroxyl group-containing (meth)acrylate, a (meth)acrylamide type monomer or a vinyl lactam may, for example, be used as the monomer (B).

Typical examples of the above hydroxyl group-containing (meth)acrylate include hydroxyethyl (meth)acrylate, hydroxypropyl (meth)acrylate, hydroxybutyl (meth)acrylate, dihydroxypropyl (meth)acrylate, and diethylene glycol mono (meth)acrylate. Typical examples of the above (meth)acrylamide type monomer include (meth)acrylamide, N-methyl (meth)acrylamide, N-ethyl (meth)acrylamide, N-hydroxyethyl (meth)acrylamide, and N,N'-dimethyl (meth)acrylamide. A typical example of the above vinyl lactam may be N-vinylpyrrolidone.

For example, in order to further improve the oxygen permeability of the resulting highly oxygen-permeable heat-resistant material, a silicon-containing (meth)acrylate, a silicon-containing styrene derivative, a fluorine-containing (meth)acrylate, a fluorine-containing styrene derivative, or a fluorine and/or silicon-containing fumarate may, for example, be employed.

Typical examples of the silicon-containing (meth)acrylate include pentamethyldisiloxanylmethyl (meth)acrylate, pentamethyldisiloxanylpropyl (meth)acrylate, methylbis(trimethylsiloxy)silylpropyl (meth)acrylate, and tris(trimethylsiloxy)silylmethyl (meth) acrylate. Typical examples of the above silicon-containing styrene derivative include trimethylsilylstyrene, and tris(trimethylsiloxy)silylstyrene. Typical examples of the fluorine-containing (meth)acrylate include trifluoroethyl (meth)acrylate, and hexafluoroisopropyl (meth)acrylate. Typical examples of the fluorine-containing styrene derivative include pentafluorostyrene, trifluoromethylstyrene, p-vinyl benzoic acid 2,2-trifluoro-1-(trifluoromethyl)ethyl ester, and (p-vinylphenyl)acetic acid 2,2,2-trifluoro-1-(trifluoromethyl)ethyl ester. Typical examples of the fluorine and/or silicon-containing fumarate includes bis(trimethylsilylpropyl)fumarate, bis(pentamethyldisiloxanylpropyl)fumarate, bis[tetramethyl(trimethylsiloxy)disiloxanylpropyl]fumarate, bis[trimethylbis(trimethylsiloxy)disiloxanylpropyl]fumarate, i-propyl(trimethylsilylpropyl)fumarate, siloxanyl(trimethylsilylpropyl)fumarate, i-propyl(pentamethyldisiloxanylpropyl)fumarate, cyclohexyl(pentamethyldisiloxanylpropyl)fumarate, i-propyl[tetramethyl(trimethylsiloxy)disiloxanylpropyl]fumarate, cyclohexyl[tetramethyl(trimethylsiloxy)disiloxanylpropyl] fumarate, i-propyl[trimethylbis(trimethylsiloxy)disiloxanylpropyl]fumarate, cyclohexyl[trimethylbis(trimethylsiloxy)disiloxanylpropyl]fumarate, and hexafluoroisopropyl(tristrimethylsiloxysilylpropyl)fumarate.

Further, for example, in order to improve the mechanical strength of the resulting highly oxygen-permeable heat-resistant material, a styrene derivative which may be substituted by an alkyl group, an alkyl (meth)acrylate or an alkyl fumarate may, for example, be employed.

Typical examples of the styrene derivative which may be substituted by an alkyl group include o-methylstyrene, m-methylstyrene, p-methylstyrene, trimethylstyrene, p-t-butylstyrene, and m-t-butylstyrene. Typical examples of the alkyl (meth)acrylate include methyl (meth)acrylate, ethyl (meth)acrylate, m-propyl (meth)acrylate, i-propyl (meth)acrylate, n-butyl (meth)acrylate, i-butyl hexafluoroisopropyl(tristrimethylsiloxysilylpropyl)fumarate.

Further, for example, in order to improve the mechanical strength of the resulting highly oxygen-permeable heat-resistant material, a styrene derivative which may be substituted by an alkyl group, an alkyl (meth)acrylate or an alkyl fumarate may, for example, be employed.

Typical examples of the styrene derivative which may be substituted by an alkyl group include o-methylstyrene, m-methylstyrene, p-methylstyrene, trimethylstyrene, p-t-butylstyrene, and m-t-butylstyrene. Typical examples of the alkyl (meth)acrylate include methyl (meth)acrylate, ethyl (meth)acrylate, m-propyl (meth)acrylate, i-propyl (meth)acrylate, n-butyl (meth)acrylate, i-butyl (meth)acrylate, sec-butyl (meth)acrylate, and t-butyl (meth)acrylate. Typical examples of the alkyl fumarate include di-i-propyl fumarate, di-t-butyl fumarate, i-propyl(t-butyl)fumarate, dicyclohexyl fumarate, and cyclohexyl(t-butyl)fumarate.

The above monomer (B) may be used as a single compound or a mixture of two or more compounds. Its amount may be optionally determined depending upon the particular purpose of the resulting highly oxygen-permeable heat-resistant material or the type of the monomer (B) to be used. However, in order to obtain a good polymer or in order to further improve the oxygen permeability or the heat resistance of the polymer, it is usually preferred to use it in an amount of at least 90 parts by mol, more preferably at least 95 parts by mol, per 100 parts by mol of the silicon-containing stilbene derivative (A). Further, in order to sufficiently obtain the effects by the silicon-containing stilbene derivative (A), the amount of the monomer (B) is usually at most 1,000 parts by mol, more preferably at most 900 parts by mol, per 100 parts by mol of the silicon-containing stilbene derivative (A). Further, in the present invention, a usual crosslinking agent may be employed as an optional component to obtain a highly oxygen-permeable heat-resistant material.

Such a a crosslinking agent is a component which is capable of forming a three dimensional crosslinking structure in the highly oxygen-permeable heat-resistant material such as an ocular lens material to make it a material which is tough and has improved mechanical strength and hardness and which, at the same time, is transparent and free from turbidity or strain and rich in the optical property. Further, it provides other crosslinking effects such as the effects of improving durability such as chemical resistance, heat resistance or dimensional stability and of minimizing elution of substances.

Typical examples of the crosslinking agent include 4-vinylbenzyl (meth)acrylate, 3-vinybenzyl (meth)acrylate, ethylene glycol di(meth)acrylate, diethylene glycol di(meth)acrylate, triethylene glycol di (meth)acrylate, propylene glycol di (meth)acrylate, dipropylene glycol di(meth)acrylate, vinyl (meth)acrylate, trimethylolpropane tri(meth)acrylate, (meth)acryloyloxyethyl (meth)acrylate, divinylbenzene, diallyl phthalate, diallyl adipate, α-methylene-N-vinylpyrrolidone, 2,2-bis(4-(meth)acryloyloxyphenyl)hexafluoropropane, 2,2-bis(3-(meth)acryloyloxyphenyl) hexafluoropropane, 2,2-bis(2-(meth)acryloyloxyphenyl)hexafluoropropane, 2,2-bis(4-meth)acryloyloxyphenyl)propane, 2,2-bis(3-meth)acryloyloxyphenyl)propane, 2,2-bis(meth)acryloyloxyphenyl)propane, 1,4-bis(2-meth)acryloyloxyhexafluoroisopropyl)benzene, 1,3-bis(meth)acryloyloxyhexafluoroisopropyl)benzene, 1,2-bis(2-(meth)acryloyloxyhexafluoroisopropyl)benzene, 1,4-bis(2-(meth)acryloyloxyisopropyl)benzene, 1,3-bis(2-meth)acryloyloxyisopropyl)benzene, and 1,2-bis(2-meth)acryloyloxyisopropyl)benzene. These crosslinking agents may be used alone or in combination as a mixture of two or more of them.

The amount of the crosslinking agent is usually preferably at least 1 part by weight, more preferably at least 5 parts by weight, per 100 parts by weight of the total amount to the polymerizable components, in order to sufficiently improve the mechanical strength of the highly oxygen-permeable heat-resistant material. Further, it is usually preferably at most 15 parts by weight, more preferably at most 10 parts by weight, per 100 parts by weight of the total amount of the polymerizable components, in order to prevent the possibility of weakening against a stress such as an impact.

As a method for producing the highly oxygen-permeable heat-resistant material of the present invention, there may, for example, be mentioned a method wherein a radical polymerization initiator such as azobisisobutyronitrile, azobisdimethylvaleronitrile, benzoyl peroxide, t-butyl hydroperoxide or cumene peroxide is added to the polymerizable component obtained by mixing the above silicon-containing stilbene derivative (A) and, if necessary, the monomer (B) and the crosslinking agent, usually in an amount of from 0.01 to 1 part by weight, per 100 parts by weight of the total amount of the polymerizable component, followed by polymerization in a usual manner such as heating, to obtain a polymer, or a method in which a photopolymerization initiator such as benzoyl, benzophenone or benzil, is added to the polymerizable component in an amount of from 0.01 to 1 part by weight, per 100 parts by weight of the total amount of the polymerizable component, followed by polymerization by irradiation with light rays with a wavelength corresponding to the absorption band of the photopolymerization initiator, to obtain a polymer.

Preparation of the above polymer can be carried out by e.g. bulk polymerization, or solution polymerization using a solvent such as chloroform, acetone or benzene. In a case where the silicon-containing stilbene derivative (A) or the maleimide compound as an example of the monomer (B) are solid and have no good compatibility with other polymerizable components, it is preferred to employ a solution polymerization method.

A method for processing the polymer thus obtained into a highly oxygen-permeable heat-resistant material of the present invention having a desired shape, is not particularly limited. For example, it may be a method wherein the polymer is dissolved in a solvent such as chloroform, acetone, benzene or tetrahydrofuran, and then the resulting solution of the polymer is cast, a method wherein compression forming is applied to the polymer, or a method wherein the polymer or the polymer solution is subjected to injection molding.

Further, the above polymer may be dissolved in a monomer component, followed by polymerization to form a polymer alloy having two or more polymers mixed, and the obtained polymer alloy may be processed into a highly oxygen-permeable heat-resistant material having a desired shape by the above-mentioned method.

The highly oxygen-permeable heat-resistant material of the present invention has a feature that it is particularly excellent in the oxygen permeability and has excellent transparency and a high refractive index. Accordingly, it is useful as an ocular lens material. When such a highly oxygen-permeable heat-resistant material is used as an ocular lens material such as a contact lens material or an intraocular lens material, the method for preparing an ocular lens such as a contact lens from the ocular lens material, may, for example, be a method wherein mechanical processing such as cutting and polishing, is applied to the obtained polymer to obtain a lens having a desired shape. As another method, a method may be mentioned wherein a mold having a desired shape is prepared, and the respective components such as the above mentioned polymerization components, may directly be polymerized in such a mold to obtain a shaped product. In such a case, mechanical finishing treatment may be applied to the resulting contact lens, as the case requires.

As described in the foregoing, the highly oxygen-permeable heat-resistant material of the present invention is the one consisting essentially of a polymer obtained by polymerizing a polymerizable component containing a silicon-containing stilbene derivative of the formula (I). Accordingly, by virtue of such a silicon-containing stilbene derivative, the material is excellent particularly in the oxygen permeability and heat resistance and has high hardness, a high refractive index and excellent transparency, dimensional stability and durability, and it is suitable for use as an oxygen enriching membrane or as an ocular lens material.

Now, the highly oxygen-permeable heat-resistant material of the present invention will be described in further detail with reference to Examples. However, it should be understood that the present invention is by no means restricted to such specific Examples.

PREPARATION EXAMPLE 1

Preparation of trans-4,4'-bis(trimethylsilyl)stilbene

Into a four-necked round bottom flask having a capacity of 2 l and equipped with a stirring motor, a dropping funnel, a Dimroth condenser and a thermometer, 36.47 g (1.5 mols) of magnesium was introduced, and a solution having 235.91 g (1.0 mol) of 1,4-dibromobenzene dissolved in 750 ml of diethyl ether, was slowly dropwise added to the magnesium in a nitrogen atmosphere. After completion of the dropwise addition, the four-necked round bottom flask having a capacity of 2 l, was heated to about 40° C., and the reaction was further continued for one hour.

Then, excess magnesium was removed, and a solution having 149.3 (1.37 mols) of trimethylchlorosilane dissolved in 150 ml of diethyl ether, was dropwise added to the four-necked round bottom flask having a capacity of 2 l. After completion of the dropwise addition, stirring was continued at room temperature for 16 hours.

The precipitated salt was removed by filtration, and 200 ml of distilled water was slowly dropwise added to the filtrate under cooling with ice to deactivate an unreacted Grignard reagent and trimethylchlorosilane. Then, the organic layer was taken out and washed three times with 500 ml of distilled water. The organic layer was dried over anhydrous sodium sulfate, and the solvent was distilled off. The obtained liquid was purified by distillation to obtain 43.24 g of 4-trimethylsilylbromobenzene (boiling point: 118.6–126.0° C./20 mmHg).

Then, into a four-necked round bottom flask having a capacity of 200 ml and equipped with a stirring motor, a dropping funnel, a Dimroth condenser and a thermometer, 4.59 g (0.189 mol) of magnesium was introduced, and a solution having 43.24 g (0.189 mol) of the obtained 4-trimethylsilylbromobenzene dissolved in 90 ml of diethyl ether, was slowly dropwise added to the magnesium in a nitrogen atmosphere. After completion of the dropwise addition, the four-necked round bottom flask having a capacity of 200 ml, was heated to about 40° C., and the reaction was further continued for one hour. Then, a solution having 7.27 g (0.075 mol) of trans-1,2-dichloroethylene dissolved in 10 ml of diethyl ether, was dropwise added to the four-necked round bottom flask having a capacity of 200 ml, and stirring was continued at room temperature for 16 hours.

The precipitated salt was removed by filtration, and the filtrate was washed three times with 200 ml of distilled water. Then, the taken out organic layer was dried over anhydrous sodium sulfate, and the solvent was distilled off to obtain 35.72 g of slightly yellow crystals (yield: 22.1%).

The obtained slightly yellow crystals were dissolved in carbon tetrachloride, and the 1H-NMR spectrum (60 MHz) was measured by means of JNM-PMX 60, manufactured by JEOL LTD. As a result, a signal attributable to —Si(CH$_3$)$_3$ was observed in the vicinity of 0.26 ppm, a signal attributable to —HC=CH— was observed in the vicinity of 7.07 ppm, and a signal attributable to an aromatic nucleus hydrogen was observed in the vicinity of 7.45 ppm.

Further, the mass spectrum was measured by means of GC-MS (5809 II gas chromatograph+5971A mass detector), manufactured by Hewlett-Packard Co. As a result, it was observed that a molecular ion peak was present at 324.

Furthermore, the infrared absorption spectrum was measured by a KBr tablet method by means of FT/IR-8300, manufactured by Nippon Bunko Kogyo K.K. As a result, an absorption attributable to C—H of an aromatic nucleus was observed in the vicinity of 3080 cm$^{-1}$ and 3100 cm$^{-1}$, an absorption attributable to C—H of an ethylene group was observed in the vicinity of 2900 cm$^{-1}$ and 2950 cm$^{-1}$, and an absorption attributable to Si—C was observed in the vicinity of 840 cm$^{-1}$.

From these results, the obtained slightly yellow crystals were confirmed to be trans-4,4'-bis(trimethylsilyl)stilbene of the formula:

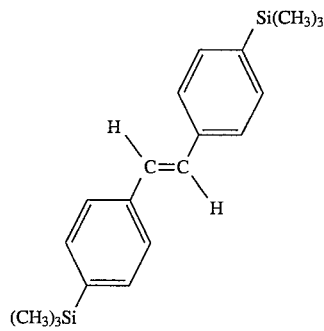

EXAMPLE 1

0.6492 g (2 mmol) of trans-4,4'-bis(trimethylsilyl)stilbene obtained in Preparation Example 1, 0.363 g (2 mmol) of N-phenylmaleimide and 0.003 g of 2,2'-azobis(2,4-dimethylvaleronitrile) as a polymerization initiator were dissolved in 3 ml of chloroform, and the solution was introduced into a glass test tube, sealed and polymerized in a constant temperature water tank of 35° C. for 64 hours. Then, the solution containing the formed polymer was dropwise added to a large amount of methanol to precipitate the polymer, which was purified by reprecipitation. The obtained purified polymer was dissolved in chloroform and cast to obtain a test sample film having a thickness of about 0.1 mm. Such a test sample film was visually inspected, whereby it was colorless and excellent in the transparency.

Using the obtained test sample film, the oxygen permeation coefficient and the glass transition temperature were measured in accordance with the following methods. As a result, the oxygen permeation coefficient was $79.3 \cdot 10^{-11}$ (cm$^2$/sec).(mlO$_2$/(ml×mmHg)), and the glass transition temperature was 360° C.

(a) Oxygen permeation coefficient

Using a Seikaken Model film oxygen permeation meter manufactured by Rika Seiki Kogyo K.K., the oxygen permeation coefficient was measured in a physiological sodium chloride aqueous solution.

(b) Glass transition temperature

Using a dynamic visco elasticity measuring apparatus RSA II, manufactured by Rheometrics Co. Ltd., the temperature dispersion (frequency: 1 Hz) was measured in a tensile mode, whereby the temperature at which the storage modulus of elasticity started to decrease was taken as the glass transition temperature.

EXAMPLE 2

A test sample film having a thickness of about 0.1 mm was prepared in the same manner as in Example 1 except that in Example 1, 0.3783 g (2 mmol) of N-p-hydroxyphenylmaleimide was used instead of 0.363 g (2 mmol) of N-phenylmaleimide, and the amount of chloroform was changed from 3 ml to 3.5 ml. Such a test sample film was visually inspected, whereby it was colorless and excellent in the transparency.

Using the obtained test sample film, the oxygen permeation coefficient was measured in the same manner as in Example 1, whereby it was $60.1\times10^{-11}$ $(cm^2/sec).(mlO_2/(ml\times mmHg))$.

Comparative Example 1

1.7317 g (10 mmol) of 4-trimethylsilylstyrene, 1.7634 g (10 mmol) of N-phenylmaleimide and 0.015 g of 2,2'-azobis(2,4-dimethylvaleronitrile) as a polymerization initiator were dissolved in 15 ml of acetone, and the solution was introduced into a glass test tube, deaerated, then sealed and polymerized in a constant temperature water tank at 35° C. for 64 hours. Then, the solution containing the formed polymer was dropwise added to a large amount of diethyl ether to precipitate the polymer, which was purified by reprecipitation. The obtained purified polymer was dissolved in chloroform and cast to obtain a test sample film having a thickness of about 0.1 mm. Such a test sample film was visually inspected, whereby it had sufficient transparency as an ocular lens material.

Using the obtained test sample film, the oxygen permeation coefficient and the glass transition temperature were measured in the same manner as in Example 1. As a result, the oxygen permeation coefficient was $30.8\times10^{-11}$ $(cm^2/sec).(mlO_2/(ml\times mmHg))$, and the glass transition temperature was 214° C.

From the above results, it is evident that the films of Examples 1 and 2 obtained by using a silicon-containing stilbene derivative as a polymerizable component, have oxygen permeation coefficients remarkably larger by twice or more than the film of Comparative Example 1 obtained by using a conventional silicon-containing styrene type monomer as a polymerizable component, and the film of Example 1 has a glass transition temperature higher by at least 100° C. than the film of Comparative Example 1. This indicates that the films of the Examples of the present invention are far superior in the oxygen permeability and have high hardness and excellent heat-resistance.

The highly oxygen-permeable heat-resistant material of the present invention is the one obtained by using a specific silicon-containing stilbene derivative as a polymerizable component, and accordingly it is particularly excellent in the oxygen permeability and has a high glass transition temperature, excellent heat resistance and high hardness, and it is further excellent in the transparency, dimensional stability and durability and has a high refractive index. As such, it is suitable for use as an oxygen enriching membrane or as an ocular lens material such as a contact lens material or an intraocular lens material.

What is claimed is:

1. A highly oxygen-permeable heat-resistant material consisting essentially of a polymer obtained by polymerizing a polymerizable component containing a silicon-containing stilbene derivative of the formula (I):

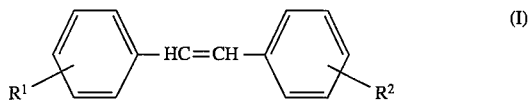

wherein each of $R^1$ and $R^2$ which are independent of each other, is a hydrogen atom or a group of the formula (II):

wherein p is an integer of from 1 to 8, provided that at least one of $R^1$ and $R^2$ is the group of the formula (II).

2. The highly oxygen-permeable heat-resistant material according to claim 1, wherein the polymer is obtained by polymerizing another polymerizable component which is a monomer having an unsaturated double bond copolymerizable with the silicon-containing stilbene derivative.

3. The highly oxygen-permeable heat-resistant material according to claim 2, wherein the monomer having an unsaturated double bond copolymerizable with the silicon-containing stilbene derivative is a maleimide compound or maleic anhydride.

4. The highly oxygen-permeable heat-resistant material according to claim 1, wherein the formula (II):

5. The highly oxygen-permeable heat-resistant material according to claim 1, which is an ocular lens material.

6. The highly oxygen-permeable heat-resistant material according to claim 2, which is an ocular lens material.

7. The highly oxygen-permeable heat-resistant material according to claim 3, which is an ocular lens material.

* * * * *